UNITED STATES PATENT OFFICE 2,544,472

PREPARATION OF DIBORANE

Hermann I. Schlesinger, Chicago, Ill., and Herbert C. Brown, Detroit, Mich., assignors to the United States of America as represented by the United States Atomic Energy Commission No Drawing. Application February 6, 1945, Serial No. 576,502

18 Claims. (Cl. 23—204)

The invention relates to the preparation of boron hydrides, and more particularly to the preparation of diborane, $B_2H_6$.

Hitherto, diborane has been prepared either by the hydrolysis of magnesium boride or by the reaction of boron halide vapor and hydrogen in a glow discharge in vacuo, thereby forming an addition product that disproportionates under heating to yield diborane. The hydrolysis of magnesium boride is undesirable in that the process is complex, the yields obtained are small, and the process cannot be efficiently adapted for large scale production. The conventional glow discharge method has the disadvantages of inconvenience and waste of liquid nitrogen.

It is an object of the present invention to provide an improved process for the preparation of diborane.

In accordance with the present invention it has been found that diborane may be produced by reaction of an hydride of an alkali metal with a trihalide of boron such as boron trifluoride. It has also been found that the reaction between the alkali metal hydride and the boron halide may be accelerated by the use of an organic solvent for the boron halide. Ethers or organic oxides such as, diethyl ether, methyl ether, butyl ether, dioxane and methyl Cellosolve, have been found to be particularly suitable and appear to take an important part in the reaction. However, other solvents may be used. The reaction probably proceeds in accordance with one or both of the following equations in which Me indicates an alkali metal and X indicates a halide:

(1) 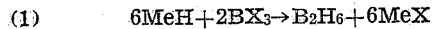  $6MeH + 2BX_3 \rightarrow B_2H_6 + 6MeX$ (2)   $6MeH + 8BX_3 \rightarrow B_2H_6 + 6MeBX_4$ where an organic ether such as diethyl ether, for example, is used to dissolve the boron halide, a coordination compound may be formed. In such a case the reaction probably proceeds in accordance with one or both of Equations 3 and 4:

(3) 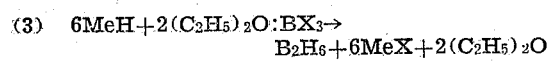  $6MeH + 2(C_2H_5)_2O{:}BX_3 \rightarrow$
$B_2H_6 + 6MeX + 2(C_2H_5)_2O$ (4) 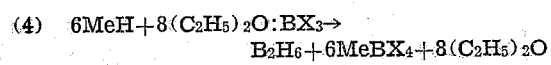  $6MeH + 8(C_2H_5)_2O{:}BX_3 \rightarrow$
$B_2H_6 + 6MeBX_4 + 8(C_2H_5)_2O$ The alkali metal hydride is preferably used in a finely divided form to provide intimate contact with the boron halide. Alkali metal hydrides such as lithium, sodium, and potassium hydrides may be used.

Of the boron halides that are available for the reaction, boron fluoride, $BF_3$, has been found to be particularly suitable for use in the process, although boron chloride, $BCl_3$, boron bromide, $BBr_3$, and boron iodide, $BI_3$, may be used.

In carrying out the invention, the reactants, preferably in stoichiometric proportions or with an excess of the boron halide, are introduced into a suitable reactor. A reactor provided with an agitator and a reflux condenser is generally suitable. Means are generally provided for introduction of a non-reactive gas such as nitrogen into the reactor in order to establish an essentially inert atmosphere.

While the reaction may be carried out at room temperature, it has been found that the reaction is accelerated by maintaining the reactor at a temperature higher than room temperature. Generally, the reaction is conducted between 0° C. and 100° C.; and within this range the reaction may be made to proceed rapidly or slowly by adjusting the temperature. The reactor is preferably heated in an even manner such as, for example, by an oil bath surrounding the lower portion of the reactor and maintained at the desired temperature by suitable heating means.

Where the reactor is maintained at a temperature of approximately 60° C. during the reaction, a substantial length of time is required for the reaction to be completed. In either the presence or absence of an organic solvent for the boron halide, such as diethyl ether or the like, the length of time required for the substantial completion of the reaction may be shortened by utilizing the alkali metal hydride in a finely divided state, thereby providing greater intimacy of contact between the reactants. The reaction time is also shortened by agitating the alkali metal hydride during the reaction. In general, it has been found that the more vigorous the agitation of the alkali metal hydride, the shorter is the time required for substantial completion of the reaction.

The process may be conducted batchwise by introducing the alkali metal hydride and boron halide in the desired amount into the reactor and heating to a suitable temperature such as, for example, to approximately 60° C. while the contents of the reactor are being agitated. The reaction is permitted to continue until a substantial yield of diborane has been obtained. Usually the yield obtainable is substantially quantitative.

It has been found that the reaction between the alkali metal hydride and the boron halide may be accelerated by the use of an organic solvent for the boron halide. The boron halide may be dissolved by the organic solvent either before or after the introduction of the boron halide into the reactor. Organic solvents that have been used for dissolving the boron halide include dimethyl ether, diethyl ether, dibutyl ether, and dioxane. Diethyl ether has been found to be particularly suitable for use in the process. When solvents are used the boron halide preferably is dissolved in the organic solvent prior to the introduction of the boron halide into the reactor.

Inasmuch as diborane reacts violently in the presence of air, it is necessary that the process be carried out substantially in the absence of air, for example, in vacuum or in an inert atmosphere. To prevent the presence of air, the reactor may be evacuated by conventional evacuating means such as, for example, a rotary mechanical vacuum pump or the reactor may be flushed with an inert gas, such as nitrogen, helium, neon, argon, or the like, prior to the introduction of the reactants into the reactor.

In the following specific examples of the process embodying the invention, diethyl ether was used as the organic solvent. The boron halide was dissolved in the diethyl ether before being introduced into the reactor. These examples are merely illustrative since other solvents and other modifications are permissible.

*Example I.*—A one liter, three neck flask was fitted with a mercury sealed stirrer, a dropping funnel containing an inlet for pure nitrogen, and a cold finger (−80° C.) reflux condenser. The flask was flushed with nitrogen to remove air and finely divided sodium hydride in the amount of 1.03 moles was placed therein. 196 grams of diethyl ether-boron trifluoride containing 1.38 moles of boron trifluoride was added through the dropping funnel in the course of thirty minutes while the mixture was being stirred vigorously. Continuing the agitation of the reactants, the flask was immersed in an oil bath, the oil bath being maintained at approximately 60° C. The gaseous diborane was withdrawn from the reactor by passing a slow stream of nitrogen through the reactor and the resulting gas was cooled with liquid nitrogen to condense diborane which was collected from the condenser. After forty-eight hours a yield of diborane of approximately 60 per cent of the theoretical yield was obtained. Similar results may be secured using other solvents such as methyl ether or butyl ether. Moreover, the solvent may be omitted although the reaction is slower in such a case.

*Example II.*—Lithium hydride in the amount of 1.03 moles was placed in an apparatus similar to that used in Example I, which had been flushed with nitrogen to remove air and 196 grams of diethyl ether-boron trifluoride containing 1.38 moles of boron trifluoride was added through the dropping funnel in the course of thirty minutes while the mixture was being stirred vigorously. Continuing the agitation of the reactants, the flask was immersed in an oil bath, the oil bath being maintained at approximately 60° C. and the diborane removed and condensed as in Example I. After forty-eight hours a yield of diborane of approximately 61 per cent of the theoretical yield was obtained.

*Example III.*—Sodium hydride in the amount of 0.028 mole and 0.07 mole of ethyl ether-boron trifluoride containing 0.07 mole of boron trifluoride were placed in a glass tube having a capacity of approximately 150 cubic centimeters which previously had been flushed with nitrogen. Several small steel ball bearings were introduced into the tube and the tube was evacuated and sealed off. The tube was then rotated with the temperature in the tube being maintained at 60° C. After twenty-four hours a yield of diborane of approximately 88 per cent of the theoretical yield was obtained.

*Example IV.*—The process as described in Example III was carried out using lithium hydride ground to minus 200 mesh in place of sodium hydride. After twenty-four hours, a yield of diborane of approximately 90 per cent of the theoretical yield was obtained.

The diborane resulting from the reaction of the alkali metal hydride and boron halide is in the form of a gas and may be removed from the reaction flask and stored in a sealed gas bulb.

The above detailed description is given for purposes of illustration and it is to be understood that the specific details thereof are not intended as limitations upon the scope of the invention which is to be limited only by the scope of the following claims.

We claim:

1. A process of preparing diborane which comprises reacting an alkali metal hydride and a boron halide.

2. A process of preparing diborane which comprises reacting sodium hydride and a boron halide.

3. A process of preparing diborane which comprises reacting an alkali metal hydride and boron fluoride.

4. A process of preparing diborane which comprises reacting sodium hydride and boron fluoride.

5. A process of preparing diborane which comprises reacting an alkali metal hydride and a boron halide in the presence of an organic solvent for said boron halide.

6. A process of preparing diborane which comprises reacting an alkali metal hydride and a boron halide in the presence of an ether.

7. A process of preparing diborane which comprises reacting an alkali metal hydride and boron trifluoride in the presence of ether.

8. A process of preparing diborane which comprises reacting an alkali metal hydride and boron trifluoride in the presence of diethyl ether.

9. A process of preparing diborane which comprises heating an intimate mixture of an alkali metal hydride and a boron halide while agitating said mixture.

10. A process of preparing diborane in a closed system which comprises introducing an alkali metal hydride into the closed system, removing a substantial amount of air from said system, and introducing a boron halide into said system and into contact with the alkali metal hydride, the temperature of the alkali metal hydride and boron halide being maintained between about 0° C. and 100° C.

11. A process of preparing diborane in a closed system which comprises introducing an alkali metal hydride into the closed system, removing a substantial amount of air from said system, introducing a boron halide into said system and into contact with the alkali metal hydride, and agitating the alkali metal hydride and boron halide while maintaining the temperature of the alkali metal hydride and boron halide between 0° C. and 100° C.

12. A process of preparing diborane in a closed system which comprises introducing an alkali metal hydride into the closed system, removing a substantial amount of air from said system, and introducing a solution containing a boron halide dissolved in an organic solvent into said system and into contact with the alkali metal hydride, the temperature of the alkali metal hydride and boron halide being maintained between 0° C. and 100° C.

13. A process of preparing diborane in a closed system which comprises introducing sodium hydride into the closed system, removing a substantial amount of air from said system, adding a solution containing boron trifluoride dissolved in an organic solvent into said system and into contact with the sodium hydride, and agitating the sodium hydride and boron trifluoride while maintaining the sodium hydride and boron trifluoride at a temperature of between 0° C. and 100° C.

14. A method which comprises forming a solution of a boron halide in an organic solvent and reacting the solution with an alkali metal hydride.

15. The process of claim 14 wherein the solvent is an ether.

16. In the preparation of diborane, the step which comprises reacting finely divided lithium hydride with boron fluoride.

17. In the preparation of diborane, the steps which comprise bringing together finely divided lithium hydride and boron fluoride in the presence of a non-aqueous liquid, and heating the liquid sufficiently to effect the formation and distillation of the diborane.

18. In the preparation of diborane, the steps which comprise bringing together finely divided lithium hydride and boron fluoride in the presence of ethyl ether, heating the ether to expel the resulting diborane, subjecting the distillate to a condensing temperature to separate ether and fluoride from the diborane, and removing the diborane from the condensing zone.

HERMANN I. SCHLESINGER.
HERBERT C. BROWN.

No references cited.